United States Patent
Casella et al.

(10) Patent No.: US 8,442,736 B2
(45) Date of Patent: May 14, 2013

(54) SYSTEM FOR ENHANCING CORNERING PERFORMANCE OF A VEHICLE CONTROLLED BY A SAFETY SYSTEM

(75) Inventors: Salvatore Casella, Turin (IT); Francesco Canuto, Turin (IT); Nicola Natali, Turin (IT); Andrea Fortina, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 341 days.

(21) Appl. No.: 12/859,855

(22) Filed: Aug. 20, 2010

(65) Prior Publication Data
US 2011/0054757 A1    Mar. 3, 2011

(30) Foreign Application Priority Data
Aug. 27, 2009 (EP) .................... 09425333

(51) Int. Cl.
*B60T 8/24* (2006.01)
*B60T 8/34* (2006.01)
*B62D 11/00* (2006.01)
*B60K 28/10* (2006.01)
*G05B 13/02* (2006.01)
*B64C 13/18* (2006.01)

(52) U.S. Cl.
USPC ............ 701/72; 701/41; 180/280; 303/140; 303/138; 700/42; 318/586

(58) Field of Classification Search ........... 701/42, 701/41, 60, 69, 70, 71, 72, 75, 74, 78, 83, 701/40, 57, 73, 77, 79, 80, 84, 82, 81, 110; 180/244, 275–276, 325, 252, 253, 280, 282, 180/119, 118, 197; 700/42, 41, 43; 30/140, 30/146, 149, 150, 139, 133, 138, 176, 192, 30/113.2, 112, 900, 901; 318/586, 585, 60, 318/63, 61, 64, 86, 90, 703, 258, 259
See application file for complete search history.

(56) References Cited

U.S. PATENT DOCUMENTS

| 5,842,754 | A | 12/1998 | Sano |
| 5,865,513 | A * | 2/1999 | Inagaki et al. ............... 303/146 |
| 2004/0176899 | A1 | 9/2004 | Hallowell |
| 2007/0005214 | A1 * | 1/2007 | Villella et al. .................. 701/70 |

FOREIGN PATENT DOCUMENTS

| EP | 1 695 894 | 8/2006 |
| WO | WO 02/090161 | 11/2002 |
| WO | WO 2004/048171 | 6/2004 |

* cited by examiner

Primary Examiner — Muhammad Shafi
(74) Attorney, Agent, or Firm — Gottlieb, Rackman & Reisman, P.C.

(57) ABSTRACT

A system for controlling a vehicle having a brake assembly for exerting braking force on at least one wheel on the basis of a number of control parameters is provided. The system has a safety system configured to generate the control parameters as a function of a control quantity associated with the braking force to be exerted on the at least one wheel; and a vehicle handling enhancement system configured to: calculate a reference vehicle yaw acceleration on the basis of at least the longitudinal speed of the vehicle and the steer angle of the vehicle; and adjust the control quantity to zero the difference between the actual yaw acceleration and the reference vehicle yaw acceleration.

6 Claims, 3 Drawing Sheets

SYSTEM FOR ENHANCING CORNERING PERFORMANCE OF A VEHICLE CONTROLLED BY A SAFETY SYSTEM

The present invention relates to a system for enhancing the cornering performance of a vehicle, in particular an automobile, controlled by a safety system.

BACKGROUND OF THE INVENTION

As is known, over the past few years, the automotive industry has become increasingly aware of the need to improve driving safety.

Accordingly, safety systems have been devised, such as the Antilock Braking System, Electronic Stability Control System, Anti-Slip Regulation System, which are configured, to intervene when a critical instability condition of the vehicle, e.g. when cornering, is determined.

As is also known, in recent times, a demand has arisen among drivers of vehicles equipped with the above safety systems to enhance vehicle performance, in particular handling of the vehicle when cornering, to achieve a more personal high-performance, e.g. racing, driving mode.

Accordingly, auxiliary control systems have been devised, such as the Active Differential and Rear Wheel Steering systems.

Though efficient, auxiliary control systems of the above type have not met with much success in the vehicle control system market, on account of their high cost.

SUMMARY OF THE INVENTION

It is an object of the present invention to provide a safety-system-equipped vehicle control system, which is cheap to produce, and which at the same time provides for enhancing cornering performance of the vehicle to meet driver demand for enhanced driving performance.

According to the present invention, there is provided a vehicle control system as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
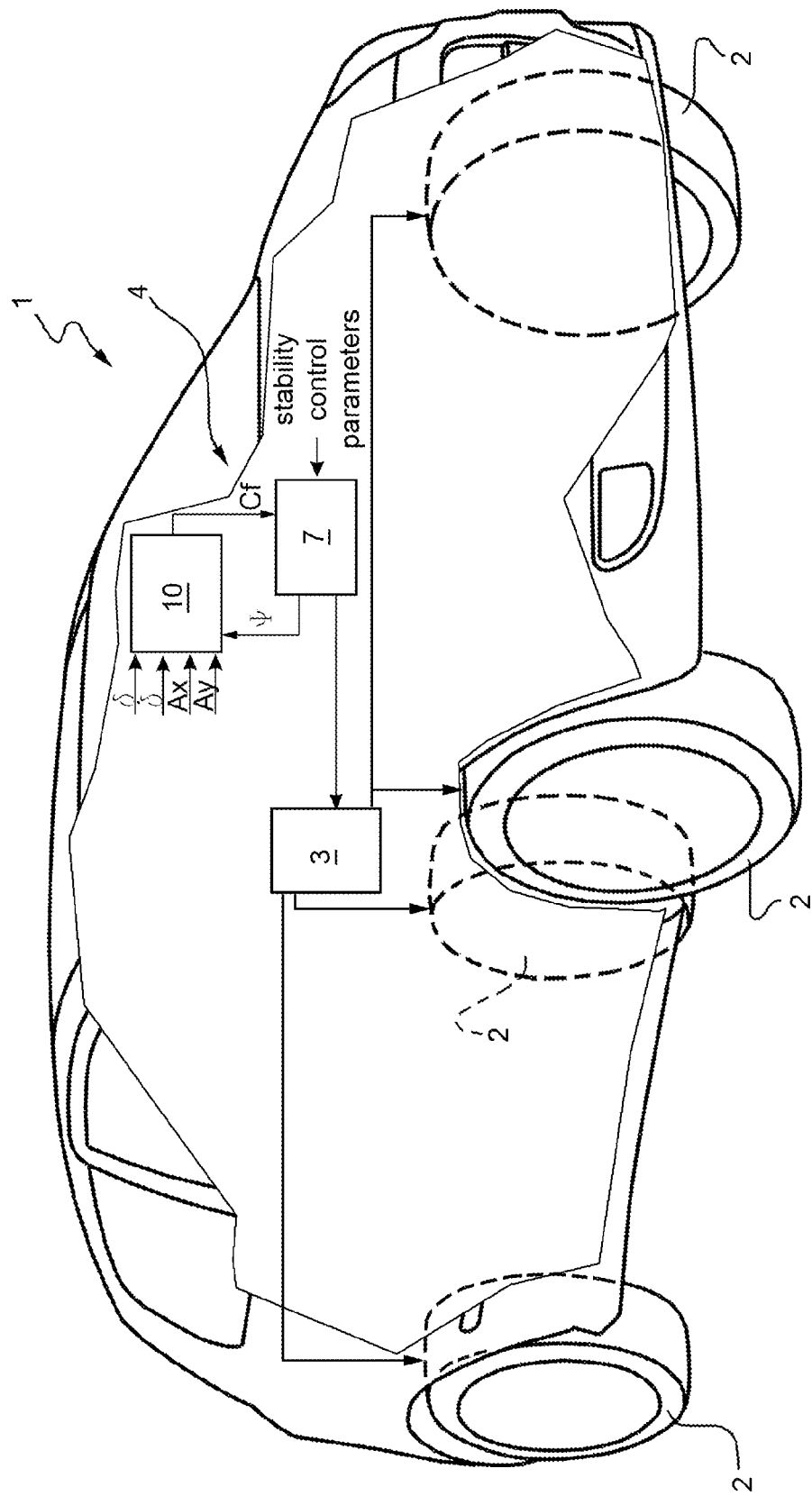
FIG. 1 shows a schematic of an automobile comprising a vehicle control system, equipped with a vehicle handling enhancement system, in accordance with the teachings of the present invention.

Number 1 in FIG. 1 indicates as a whole a vehicle, in particular an automobile, comprising four supporting wheels 2; a brake assembly 3 for braking wheels 2 of vehicle 1; and a vehicle control system 4 which controls brake assembly 3 to coordinate braking of wheels 2 by brake assembly 3.

Brake assembly 3 is a known device and, not being the object of the present invention, is not described in detail, except to state that it comprises brake calipers (not shown), each associated with a respective wheel 2 and selectively activatable to exert braking action on wheel 2.

Vehicle control system 4 comprises a safety system 7 designed to prevent locking of the vehicle wheels and loss of control of the vehicle when braking, and/or to intervene, when skidding, by adjusting output of the engine and/or differentially regulating a parameter controlling the braking force on wheels 2 of vehicle 1, to automatically right vehicle 1.

More specifically, in the example shown, safety system 7 preferably, though not necessarily, comprises an ABS (Antilock Braking System) and/or ESC (Electronic Stability Control) system, and/or any other similar type of vehicle safety system.

More specifically, safety system 7 is configured to determine distribution of the braking torques Cfi to be applied by brake assembly 3 to the brake calipers of wheels 2 of vehicle 1.

More specifically, safety system 7 receives a parameter regulating the braking force, in particular the braking torque Cf, to be applied, when cornering, to the brake caliper of the rear wheel 2 of vehicle 1 on the inside of the curve travelled by vehicle 1.

Safety system 7 supplies a number of vehicle parameters, some measured by sensors (not shown) on vehicle 1, and others obtained in known manner by specific processing.

More specifically, safety system 7 supplies the following parameters: vehicle speed Vel measured along the longitudinal axis of the vehicle; actual yaw rate $\dot{\psi}$ corresponding to the measured yaw rate of the vehicle; the driver-set steer angle $\delta$ of the front wheels of vehicle 1; vehicle accelerator pedal operating speed $\omega$, which is also used as an additional parameter by the system to conveniently strengthen the system and/or as a plausibility check and/or for safety reasons; steering speed $\dot{\delta}$ of the vehicle front wheels, which is also used as an additional parameter by the system to conveniently strengthen the system and/or as a plausibility check and/or for safety reasons; longitudinal vehicle acceleration ax, which is also used as an additional parameter by the system; and transverse vehicle acceleration ay, which is also used as an additional parameter by the system.

Vehicle 1 also comprises a vehicle handling enhancement system 10 designed to cooperate with safety system 7 to allow the driver to "modify" the dynamic behaviour of vehicle 1 when cornering.

Vehicle handling enhancement system 10 is configured to calculate a reference yaw acceleration $\ddot{\psi}_{REF}$ as a function of the dynamic behaviour of the vehicle, and calculates a control parameter related to the braking force, more specifically the braking torque Cf, to be supplied to safety system 7, on the basis of the difference between reference yaw acceleration $\ddot{\psi}_{REF}$ and the actual yaw acceleration $\ddot{\psi}$.

More specifically, vehicle handling enhancement system 10 is configured to regulate the braking torque Cf to be exerted on the inside rear wheel 2 of vehicle, to zero the difference between reference yaw acceleration $\ddot{\psi}_{REF}$ and actual yaw acceleration $\ddot{\psi}$.

In other words, vehicle handling enhancement system 10 provides for generating reference yaw acceleration $\ddot{\psi}_{REF}$ related to the dynamic cornering behaviour of the vehicle induced by the driver, and, in stable conditions, regulates the braking torque Cf of the inside rear wheel 2 of vehicle 1 by means of a closed control loop configured to gradually zero the difference between reference yaw acceleration $\ddot{\psi}_{REF}$ and actual yaw acceleration $\ddot{\psi}$.

Figure 2:
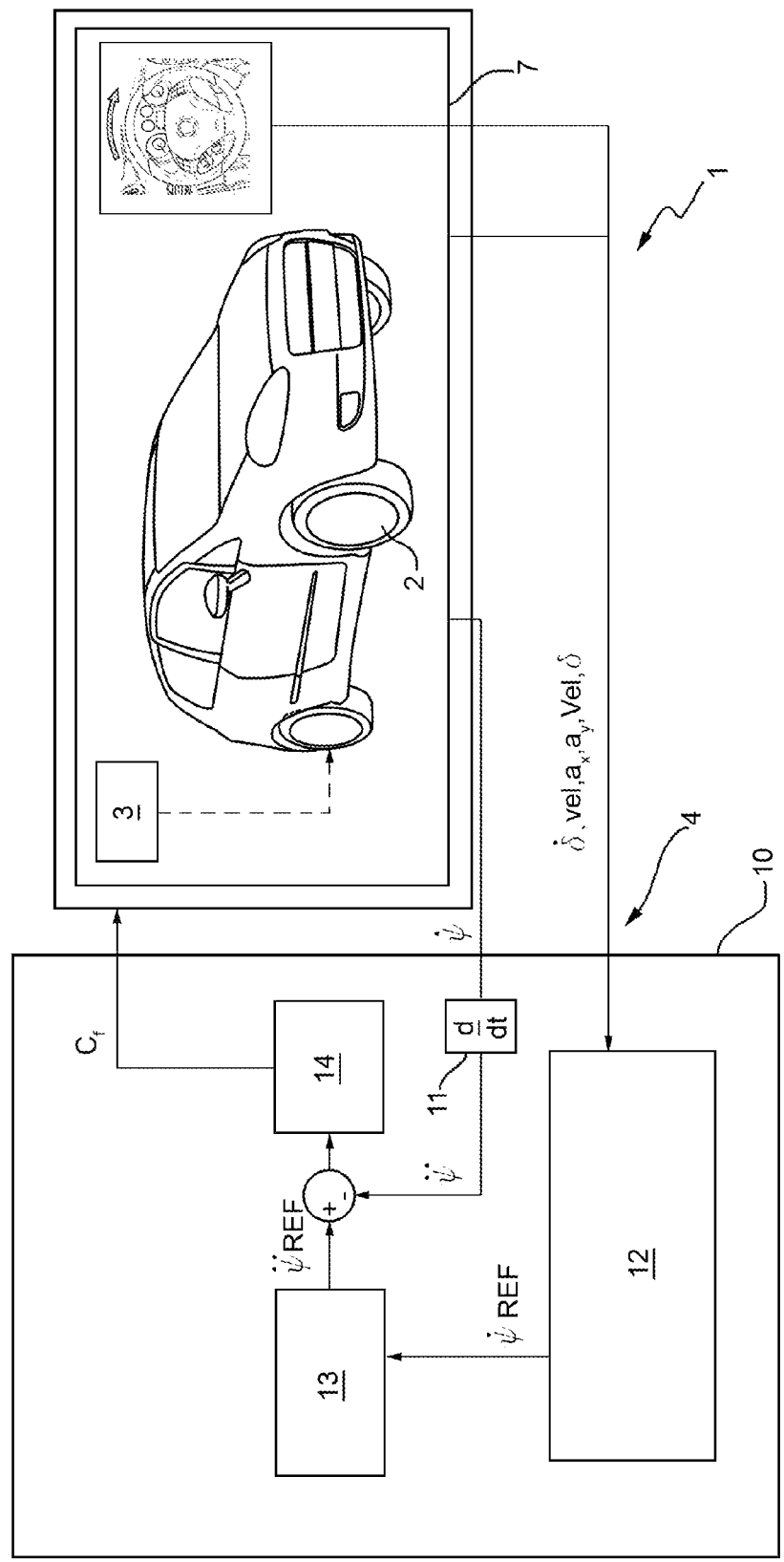
FIG. 2 shows a block diagram of the FIG. 1 vehicle control system equipped with a vehicle handling enhancement system.

With reference to FIG. 2, vehicle, handling enhancement system 10 substantially comprises: a differentiating block 11; a computing block 12; reference generating block 13; and a main controller 14.

More specifically, differentiating block 11 is configured to receive the actual yaw rate $\dot{\psi}$ measured on the vehicle, and supplies the measured yaw acceleration $\ddot{\psi}$.

More specifically, differentiating block 11 calculates measured yaw acceleration $\ddot{\psi}$ as follows:

$$\ddot{\psi} = \frac{d\dot{\psi}}{dt}$$

Computing block 12 is configured to receive: longitudinal vehicle speed Vel; the driver-set steer angle δ of the front wheels of vehicle 1; vehicle accelerator pedal operating speed ω; driver steering speed $\dot{\delta}$ of the front vehicle wheels; vehicle acceleration ax measured along the longitudinal vehicle axis; and vehicle acceleration ay along an axis crosswise to the longitudinal vehicle axis.

More specifically, computing block 12 is configured to calculate a reference yaw rate $\dot{\psi}_{REF}$ as a function of the dynamic behaviour of vehicle 1.

With reference to the FIG. 2 example, computing block 12 processes longitudinal vehicle speed Vel and steer angle δ of the front wheels of vehicle 1 to determine a reference yaw rate $\dot{\psi}_{REF}$.

More specifically, computing block 12 determines reference yaw rate $\dot{\psi}_{REF}$ according to the equation:

a)

$$\dot{\psi}_{REF} = \delta \frac{Vel}{(\tau sL + K_{US}Vel^2)}$$

where $K_{US}$ is an understeer coefficient; L is the vehicle wheelbase; and τs is the steering ratio.

Reference generating block 13 receives reference yaw rate $\dot{\psi}_{REF}$, and differentiates it to supply reference yaw acceleration $\ddot{\psi}_{REF}$.

More specifically, reference generating 13 calculates reference yaw acceleration $\ddot{\psi}_{REF}$ according to the equation:

$$\ddot{\psi}_{REF} = \frac{d\dot{\psi}_{REF}}{dt}$$

Main controller 14 receives the difference between actual yaw acceleration $\ddot{\psi}_{REF}$ and reference yaw acceleration $\ddot{\psi}_{REF}$, and accordingly generates the braking torque Cf to be applied to the brake caliper of the inside rear wheel 2 of the vehicle.

More specifically, main controller 14 may preferably, though not necessarily, comprise a proportional-integral-derivative PID module configured to regulate braking torque Cf to zero the difference between actual yaw acceleration $\ddot{\psi}$ and reference yaw acceleration $\ddot{\psi}_{REF}$.

As regards computing block 12, it should be pointed out that the dynamic behaviour model represented by equation a) is based on two assumptions; firstly, that the vehicle is cornering; and secondly, that the vehicle is stable with no roll. If both are true, dynamic vehicle behaviour can be defined by understeering coefficient $K_{US}$ according to the equation:

b)

$$\delta = \tau s \frac{L}{R} + Kus * ay$$

where ay is lateral acceleration, which can be calculated according to the equation:

c)

$$ay = \frac{Vel^2}{R} = Vel * \dot{\Psi}$$

Substituting equation c) for ay in equation b) gives equation a) defining the mathematical model employed by computing block 12.

Figure 3:
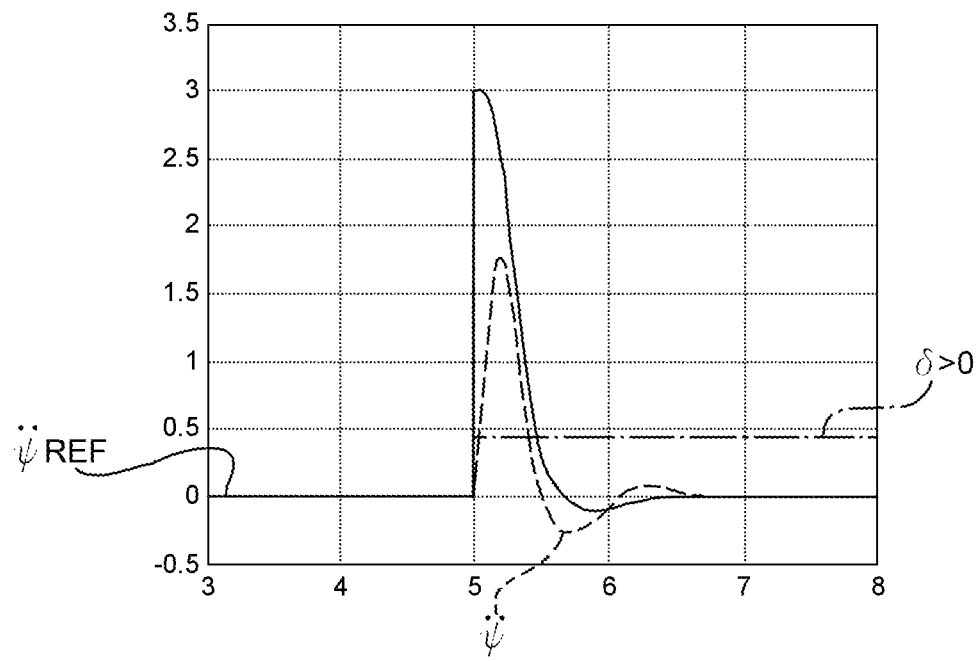
FIGS. 3 and 4 show time graphs of yaw acceleration of the vehicle in respective vehicle operating conditions.
Figure 4:
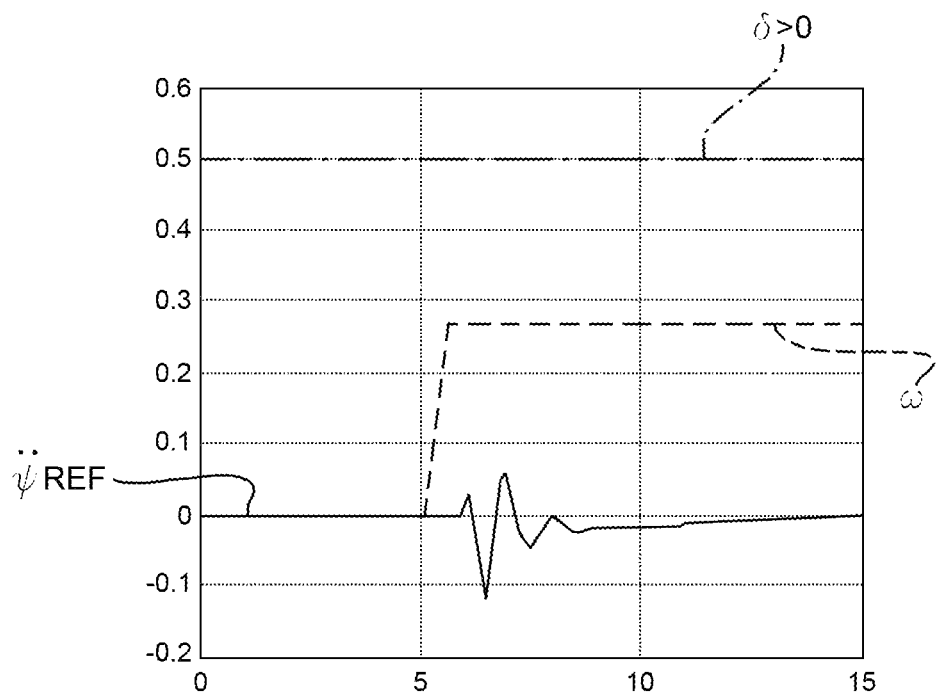

FIGS. 3 and 4 show two graphs of the response of vehicle handling enhancement system 10 in two different operating conditions.

More specifically, the FIG. 3 graph relates to an operating condition in which vehicle 1 has a steer angle δ but is not accelerating, which condition occurs when the vehicle is approaching a curve and the driver maintains a constant steer angle δ.

With reference to FIG. 3, in the presence of a steer angle, vehicle handling enhancement system 10 receives steer angle δ>0 and, by means of computing block 12, immediately increases reference yaw acceleration $\ddot{\psi}_{REF}$. At this stage, the system regulates braking torque Cf to follow the reference yaw acceleration $\ddot{\psi}_{REF}$ pattern and so zero the difference between reference yaw acceleration $\ddot{\psi}_{REF}$ and measured actual yaw acceleration $\ddot{\psi}$.

The FIG. 4 graph relates to an operating condition in which the vehicle is accelerating round a bend.

Acceleration of the vehicle subjects it to yaw acceleration, whereas the reference imposes zero acceleration. This therefore creates a reference-measurement error which computing block 12 uses and attempts to eliminate.

Besides being cheap to implement, by employing the safety system already on the vehicle, the vehicle control system described also has the advantage of allowing the driver to enhance vehicle performance to a greater degree with respect to known vehicle control systems.

Moreover, the vehicle control system may be variously adjusted, so the driver can choose the setting best suited to given driving conditions, and so obtain different performance levels of the same vehicle, depending on the chosen setting.

Clearly, changes may be made to the system described without, however, departing from the scope of the present invention as defined in the accompanying Claims.

The invention claimed is:

1. A system for controlling a vehicle comprising a number of wheels, and a brake assembly for exerting braking force on at least one wheel on the basis of a number of control parameters (Cfi); said system comprising a safety system configured to generate said control parameters (Cfi) as a function of a control quantity (Cf) associated with the braking force to be exerted on at least one of said wheels;

said system being characterized by comprising a vehicle handling enhancement system configured to:
calculate a reference vehicle yaw acceleration ($\ddot{\psi}_{REF}$) on the basis of at least the longitudinal speed (vel) of said vehicle and the steer angle (δ) of the vehicle;
adjust said control quantity (Cf) to zero the difference between the measured actual yaw acceleration ($\ddot{\psi}$) and said reference vehicle yaw acceleration ($\ddot{\psi}_{REF}$)

wherein said vehicle handling enhancement system is configured to determine said reference vehicle yaw acceleration ($\ddot{\psi}_{REF}$), while said vehicle is cornering and is stable with no roll, according to the equations:

$$\dot{\psi}_{REF} = \delta \frac{Vel}{(TsL + K_{US} Vel^2)}$$

$$\ddot{\psi}_{REF} = \frac{d\dot{\psi}_{REF}}{dt}$$

where $\dot{\psi}_{REF}$ is the reference yaw rate; $\delta$ is the steer angle; $K_{US}$ is an understeer coefficient; L is the vehicle wheelbase; TS is the steering ratio; and Vel is the longitudinal vehicle speed.

2. A system as claimed in claim 1, wherein said safety system comprises an ABS (Antilock Braking System) and/or an ESC (Electronic Stability Control) system.

3. A system as claimed in claim 1, wherein said vehicle handling enhancement system comprises a differentiating block configured to receive the actual yaw rate ($\dot{\psi}$) measured on the vehicle, and to supply the measured yaw acceleration ($\ddot{\psi}$).

4. A system as claimed in claim 1, wherein said vehicle handling enhancement system comprises a computing block configured to calculate a reference yaw rate ($\dot{\psi}_{REF}$) as a function of the dynamic behaviour of the vehicle.

5. A system as claimed in claim 1, wherein said vehicle handling enhancement system comprises a main controller which receives the difference between the actual yaw acceleration ($\ddot{\psi}$) and the reference vehicle yaw acceleration ($\ddot{\psi}_{REF}$), and generates said control quantity (Cf) as a function of said difference.

6. A system as claimed in claim 5, wherein said control quantity (Cf) corresponds to a braking torque to be applied to the inside rear wheel of the vehicle; said main controller being configured to form, together with said safety system, a closed control loop for regulating said braking torque (Cf) to zero the difference between the actual yaw acceleration ($\ddot{\psi}$) and said reference vehicle yaw acceleration ($\ddot{\psi}_{REF}$).

* * * * *